(12) United States Patent
Clemen (10) Patent No.: US 12,196,420 B2
(45) Date of Patent: Jan. 14, 2025

(54) CONNECTING APPARATUS FOR THE FLOW CONNECTION BETWEEN A FUEL FEED LINE SYSTEM AND A NOZZLE APPARATUS, NOZZLE APPARATUS AND GAS TURBINE ARRANGEMENT

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/353,424

(22) Filed: Jul. 17, 2023

(65) Prior Publication Data
US 2024/0026823 A1   Jan. 25, 2024

(30) Foreign Application Priority Data

Jul. 21, 2022   (DE) ..................... 10 2022 207 493.9

(51) Int. Cl.
*F23R 3/28*   (2006.01)
*F02C 7/22*   (2006.01)
*F23R 3/36*   (2006.01)

(52) U.S. Cl.
CPC .............. *F23R 3/283* (2013.01); *F02C 7/222* (2013.01); *F23R 3/36* (2013.01)

(58) Field of Classification Search
CPC .. F23R 3/28; F23R 3/283; F23R 3/286; F23R 3/36; F02C 7/22; F02C 7/222
See application file for complete search history.

(56) References Cited

U.S. PATENT DOCUMENTS

| 4,425,755 A | 1/1984 | Hughes |
| 2016/0116168 A1* | 4/2016 | Bandaru ................... F23R 3/28 60/39.48 |

(Continued)

FOREIGN PATENT DOCUMENTS

| CN | 105066176 A | 11/2015 |
| DE | 3029095 A1 | 2/1981 |

(Continued)

OTHER PUBLICATIONS

German Search Report dated May 12, 2023 from counterpart German Patent Application No. 10 2022 207 493.9.

(Continued)

*Primary Examiner* — William H Rodriguez
(74) *Attorney, Agent, or Firm* — SHUTTLEWORTH & INGERSOLL, PLC; Timothy J. Klima (57) ABSTRACT

A connecting apparatus for fluid connection between a fuel feed line system and a nozzle apparatus of a gas turbine arrangement, includes a gas fuel line which is surrounded by a wall for conducting a gaseous fuel, and a liquid fuel line which is surrounded by a wall for conducting a liquid fuel. Optimized operation is achieved by the connecting apparatus having at least one separate gas line portion arranged on the inlet side of the gas fuel line and a gas/liquid line portion which is arranged downstream of the separate gas line portion and within which the gas fuel line and the liquid fuel line are arranged to form a line arrangement for connection to the nozzle apparatus. The flow cross section of the gas fuel line is of at least substantially identically large configuration within the separate gas line portion and the gas/liquid line portion.

22 Claims, 9 Drawing Sheets

(56) References Cited

U.S. PATENT DOCUMENTS

| | | | |
|---|---|---|---|
| 2016/0201897 A1 | 7/2016 | Snyder et al. | |
| 2016/0209037 A1* | 7/2016 | Dai | F23R 3/12 |
| 2016/0209038 A1* | 7/2016 | Kopp-Vaughan | F23R 3/28 |
| 2017/0059071 A1* | 3/2017 | Podewski | F16L 33/22 |
| 2024/0027070 A1* | 1/2024 | Clemen | F23R 3/36 |
| 2024/0044293 A1* | 2/2024 | Snyder | F02C 9/40 |
| 2024/0044496 A1* | 2/2024 | Snyder | F23R 3/286 |

FOREIGN PATENT DOCUMENTS

| | | |
|---|---|---|
| DE | 102013100225 A1 | 7/2013 |
| EP | 0849529 A2 | 6/1998 |
| EP | 2815600 A1 | 12/2014 |

OTHER PUBLICATIONS

European Search Report dated Dec. 6, 2023 for counterpart European Patent Application No. 23186145.1.

* cited by examiner

CONNECTING APPARATUS FOR THE FLOW CONNECTION BETWEEN A FUEL FEED LINE SYSTEM AND A NOZZLE APPARATUS, NOZZLE APPARATUS AND GAS TURBINE ARRANGEMENT

This application claims priority to German Patent Application 102022207493.9 filed Jul. 21, 2022, the entirety of which is incorporated by reference herein.

The invention relates to a connecting apparatus for the flow connection between a fuel feed line system and a nozzle apparatus of a gas turbine arrangement, in particular of an engine of an aircraft, with a gas fuel line which is surrounded by a wall for conducting a gaseous fuel, and a liquid fuel line which is surrounded by a wall for conducting a liquid fuel. Furthermore, the invention relates to a nozzle apparatus and a gas turbine arrangement.

A connecting apparatus as transition between a fuel feed line system and a nozzle apparatus of the above type is specified in U.S. Pat. No. 4,425,755 A.

A nozzle apparatus for an aircraft for operating with fuels of different types is specified in US 2016/0 201 897 A1.

In the case of known so-called "dual fuel" gas turbine arrangements, in particular engines aircraft, fuels of different types, in particular liquid and/or gaseous fuels, can be injected into the combustion chamber by means of a nozzle apparatus alternately to one another or at the same time.

The present invention is based on the object of providing a connecting apparatus, a nozzle apparatus and a gas turbine arrangement of the type mentioned at the outset which make optimized operation of the gas turbine arrangement possible.

The object is achieved for the connecting apparatus, the nozzle apparatus, and for the gas turbine arrangement as disclosed herein. Advantageous design variants are also disclosed herein.

With regard to the connecting apparatus, it is proposed that the connecting apparatus has at least one separate gas line portion arranged on the inlet side of the gas fuel line and a gas/liquid line portion which is arranged downstream of the separate gas line portion and within which the gas fuel line and the liquid fuel line are arranged to form a line arrangement for connection to the nozzle apparatus, and that the flow cross section of the gas fuel line is of at least substantially identically large configuration within the separate gas line portion and the gas/liquid line portion.

The separate gas line portion is preferably of cylindrical configuration. No liquid fuel line is arranged within the separate gas line portion, the flow cross section within the separate gas line portion preferably being of circular configuration. The gas fuel line and a liquid fuel line are arranged in the line arrangement in a defined manner with respect to one another which is preferably at least substantially constant with regard to the configuration and orientation.

The gassy is feel comprises, in particular, hydrogen or is formed from hydrogen. The liquid fuel is formed, in particular, from a kerosene-based or kerosene-related fuel (for example, Jet-A1, diesel or synthetic substitute fuel (SAF—"sustainable aviation fuel")).

For simple assembly possibilities and a satisfactory replacement capability, the connecting apparatus is preferably configured as a separate component for assembly in the gas turbine arrangement.

As a result of the flow cross section of at least substantially identical size which is preferably at least substantially constant within the separate gas line portion and the line arrangement, identical flow conditions, in particular with regard to the speed and/or the pressure conditions, are advantageously achieved, as a result of which advantageous operation is made possible, in particular with regard to the open-loop and/or closed-loop control of the gas turbine arrangement.

In one design variant which is optimized in terms of installation space, in the case of the line arrangement, the gas fuel line is arranged around the liquid fuel line in the gas/liquid line portion, in particular in a cylindrical and/or coaxial manner. In this way, the gas fuel line is configured as a symmetrical (preferably constant within the line arrangement) annular gap with an annular flow cross section. The liquid fuel line preferably has a circular (constant within the line arrangement) flow cross section.

For the flow-favourable transfer of the flow between the separate gas line portion and the line arrangement, a transition portion is arranged between the separate gas line portion and the gas/liquid line portion, within which transition portion the liquid fuel line is guided through the wall in a fluid-tight manner and is brought into the arrangement, in particular surrounded by the gas fuel line, within the line arrangement. The liquid fuel line is preferably arranged, with a separate liquid line portion which is fastened to the wall on the outside, with a centre axis at a right angle with respect to the wall and/or with respect to the longitudinal axis.

Here, the liquid fuel line is expediently brought within the transition portion by means of a deflection piece from the wall to the arrangement within the line arrangement, which deflection piece brings about, in particular, a deflection in the course of the liquid fuel line from the course which adjoins the wall on the outside to the course within the line arrangement, for example by from 70° to 100°, in particular by 90°.

Favourable production options of the connecting apparatus result if the deflection piece is connected to the wall in one piece or in an integrally joined manner, for example by means of welding or soldering. In the case of the single-piece connection, the deflection piece is manufactured integrally with the connecting apparatus, in particular by means of an additive manufacturing method (3D printing).

In one flow-variable design variant, the deflection piece can be of arcuate configuration. Here, it has a curvature which is, in particular, continuous and/or runs without a kink in the liquid fuel line from the wall as far as the line arrangement.

In one design variant which is optimized for the additive manufacturing method, the deflection piece is arranged such that it is of straight configuration and/or is configured at an angle α of 45° or less (included on that side of the longitudinal axis L which extends upstream of the vertex and a centre line of the deflection piece) with regard to the longitudinal axis on the wall. There is a kink here in the course of the liquid fuel line, in particular on the wall and on the transition to the line arrangement.

Simple assembly possibilities result if the liquid fuel line has, in a separate liquid line portion outside the wall (in particular, of the hollow body or the sleeve) of the gas fuel line, a connecting piece for the (in particular, positively locking) connection to a liquid connector line of the fuel feed line system, which liquid connector line is joined to the deflection piece, for example in an integrally joined manner (by means of welding or soldering), in particular with an intermediate piece arranged in between. In particular, a fastening structure, for example a thread, can be arranged on the radial outer side of the connecting piece.

In one flow-favourable design variant, the gas fuel line is oriented (straight) along a longitudinal axis, the portions of the gas fuel line, with the separate gas line portion and/or the transition portion and/or the gas/liquid portion, being arranged coaxially with regard to the longitudinal axis.

In one design variant which is simple to manufacture, the wall of the gas fuel line is formed by way of a circumferential, in particular a cylindrical, hollow body, for example a sleeve.

Simple assembly possibilities with a connection to the fuel feed line system result if the wall, in particular the hollow body, has, on the radial outer side, a fastening structure, in particular a thread, for connection to a gas connector line of the fuel feed line system. The fastening structure is preferably arranged in the separate gas line portion, upstream of the cross-sectional step.

An excessive acceleration of the flow and an associated increased pressure loss are advantageously avoided if the wall, in particular the hollow body, has a widened cross-sectional portion, in particular a cross-sectional step, at the transition from the separate gas line portion to the transition portion. Widening of the flow cross section thus takes place first of all, upstream of the inlet of the liquid fuel line into the hollow body, before the flow cross section is reduced in size again on account of the liquid fuel line which is integrated into the line arrangement, to a size in accordance with the size within the separate gas line portion. According to the definition, the transition portion extends from (or directly downstream of) the widened cross-sectional portion as far as the beginning of the line arrangement, in which the liquid fuel line is transferred into its arrangement within the line arrangement.

Favourable assembly possibilities result if, from a downstream end of the wall of the gas fuel line and/or the wall of the liquid fuel line, the connecting apparatus has a connecting arrangement, by means of which the connecting apparatus can be connected to the nozzle apparatus in a fluid-tight manner.

A reliable sealing action with regard to the gaseous fuel is achieved if, at the downstream end of the wall, in particular of the hollow body, the connecting arrangement has a sealing cone with the formation of a radially inwardly directed sealing surface, for sealing the gas fuel line in operative connection to a complementary sealing surface of a complementary sealing cone on the nozzle apparatus. The angle of the sealing surface with regard to the longitudinal axis is, for example, between 30° and 60°, in particular between 40° and 50°, for example 45°.

One preferred design variant consists in that, at the downstream end of the wall of the liquid fuel line, the connecting arrangement has a tapered portion of the outer diameter in such a way that the wall can be pushed, in particular in a positively locking manner, into the liquid fuel line, surrounded by a complementary wall of the nozzle apparatus, in particular in a configuration of a sleeve, the inner diameter of the complementary wall preferably corresponding to the inner diameter of the wall upstream of the tapered portion, at least in the axial region of the tapered portion (and/or the line arrangement within the nozzle apparatus). The complementary wall of the nozzle apparatus is configured, in particular, as a sleeve. The flow conditions in the transition region are advantageously at least largely constant as a result of the substantially identical (constant) inner diameters of the walls of the connecting device and at the upstream end of the nozzle apparatus. At the upstream end of the nozzle apparatus, in particular at least largely within the nozzle holder, the line arrangement continues with a preferably constant arrangement of the lines with respect to one another (with the inner fluid fuel line and the gas fuel line which surrounds it as an annular gap) and with respect to the size and configuration of the flow cross sections.

A reliable, fluid-tight connection can be achieved even in the liquid fuel line if there is/are at least one, preferably two, annular cut-out/cut-outs (each) for receiving a sealing means in the axial region of the tapered portion. The sealing means is preferably formed in each case from a circumferential sealing ring which, in the installed state, develops its sealing action together with the wall of the nozzle apparatus.

The tapered portion is preferably configured in such a way that an axially sliding connection is formed in a mounted state, a circumferential gap being formed between an upstream end of the complementary wall and the cross-sectional step to the tapered portion. The gap is such that the wall of the nozzle apparatus does not come into contact with the wall of the connecting apparatus even in the case of an axial movement. In this way, no absorbing of axially acting forces takes place on the walls of the liquid fuel line, but rather on the (outer) walls of the gas fuel line. This ensures that the connecting force which acts by way of the fastening element, in particular the nut, acts completely as a pressing force on the sealing surfaces of the gas fuel line, in order to ensure its sealing effect.

A favourable fastening possibility results if the connecting arrangement has a cross-sectional step which is configured radially on the outside at the downstream end of the wall and is, in particular, circumferential, with the formation of a notch. The cross-sectional step can act as a stop for the fastening element, in particular the nut, which fastening element can be pushed over the connecting apparatus during assembly and can be fastened to the nozzle apparatus.

A reliable sealing action results if the sealing surface is arranged offset axially with respect to the tapered portion, in particular upstream of the tapered portion. In this way, in the case of any liquid fuel escaping, a contact thereof with the sealing surface within the gas fuel line and any associated impairment of the sealing action in the gas fuel line can be avoided.

The connecting apparatus preferably has a first connecting portion comprising at least the transition portion and a second connecting portion comprising at least one part of the line arrangement and the connecting arrangement, the first connecting portion and the second connecting portion being configured in one piece or being connected to one another in a positively locking, non-positive and/or integrally joined manner.

The proposed nozzle apparatus has the complementary connecting arrangement, by means of which the nozzle apparatus can be connected in a fluid-tight manner to the connecting apparatus according to one of the above design variants. The complementary connecting arrangement comprises, in particular, the complementary wall of the nozzle apparatus for surrounding the liquid fuel line and/or the complementary wall of the gas fuel line comprising the complementary sealing cone for forming the sealing arrangement in the gas fuel line. The nozzle apparatus preferably has the line arrangement at least at the upstream end, the flow cross sections of the gas fuel line and the liquid fuel line corresponding at least largely (for example, apart from transition portions such as within the connecting arrangement with regard to the liquid fuel line) in terms of their size and configuration to those of the line arrangement within the connecting apparatus.

In the following text, the invention will be explained in greater detail on the basis of exemplary embodiments with reference to the drawings, in which.

Figure 1A:
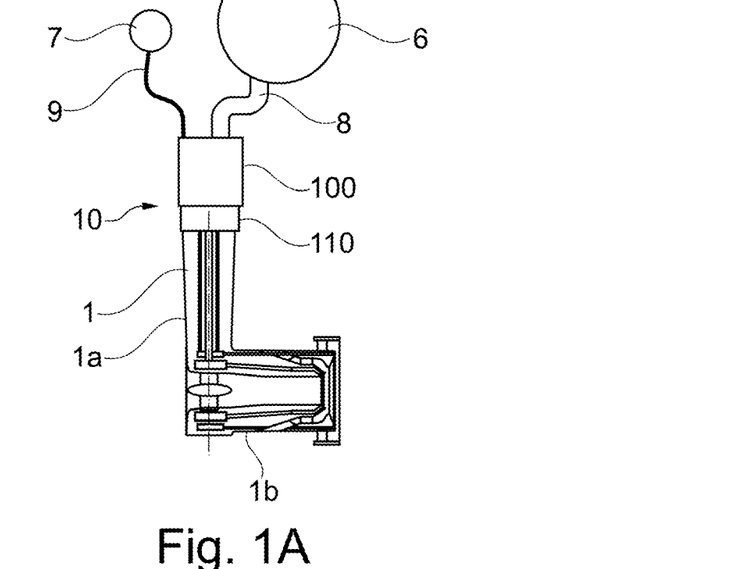
FIGS. 1A, 1B show a fuel feed line system and one (FIG. 1A) and four (FIG. 1B) nozzle apparatus/apparatuses which are connected by means of an each case one connecting apparatus to the fuel feed line system, in longitudinal section and in frontal view with a viewing direction from a combustion chamber.
Figure 1B:
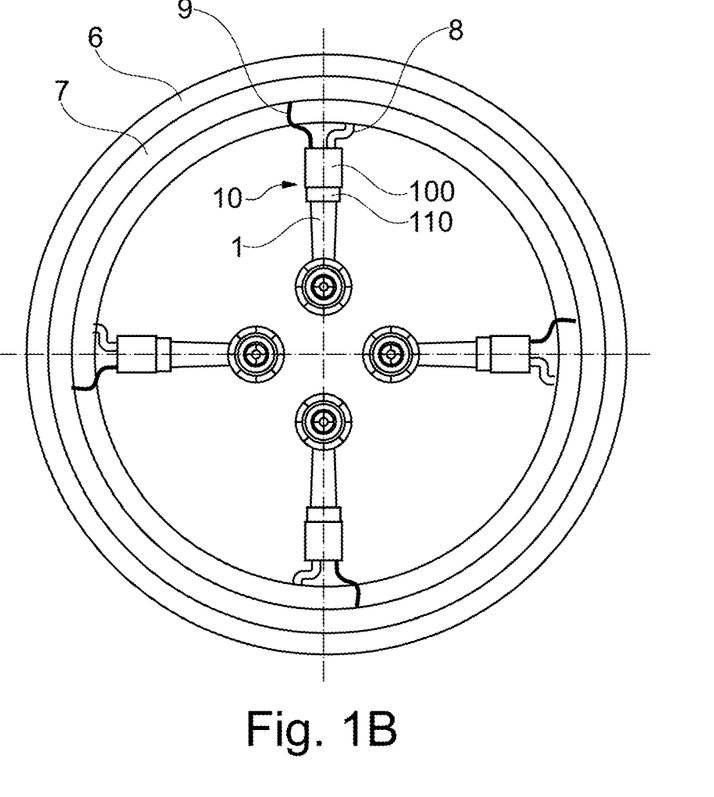

FIG. 1A and FIG. 1B show a fuel feed line system and, by way of example, four nozzle apparatuses 1 arranged on the fuel feed line system in longitudinal section (FIG. 1A) and in a frontal view (FIG. 1B, with a viewing direction from the combustion chamber), as can be used by way of example in conjunction with the proposed invention. The fuel feed line system and the nozzle apparatus 1 are specified, for example, in German Patent Application DE 10 2022 201 182.1 which was not yet published at the filing date. The fuel feed line system serves for the alternating and/or simultaneous addition of gaseous fuel and/or liquid fuel into a combustion chamber of a gas turbine arrangement, in particular of the engine of an aircraft.

The fuel feed line system comprises a gas ring line 6 and preferably precisely one gas connector line 8 per nozzle apparatus 1, and a liquid ring line 7 and preferably precisely one liquid connector line 9 per nozzle apparatus 1.

The gas ring line 6 and the liquid ring line 7 are of annular configuration, for arranging so as to run on the outside radially around the combustion chamber (not shown in FIG. 1A and FIG. 1B).

The gas connector line 8 and the liquid connector line 9 are in each case of flexible configuration, in particular.

The nozzle apparatuses 1 are connected for flow connection to the fuel feed line system in each case by way of a connecting apparatus 10 comprising connecting portions 100, 110. The connecting apparatus 10 is configured in each case as a separate component. The more detailed configuration of the connecting apparatus 10 according to FIG. 1A and FIG. 1B will be described in the following text on the basis of FIGS. 3A, 3B, 3C to FIG. 9.

Figure 2:
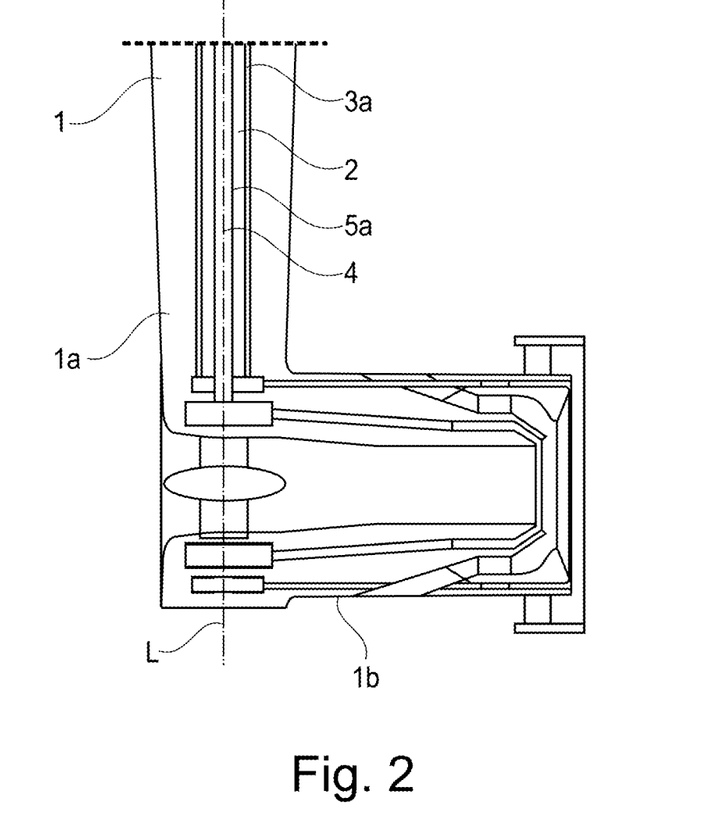
FIG. 2 shows the nozzle apparatus according to FIGS. 1A, 1B with a line arrangement having a gas fuel line and a liquid fuel line in longitudinal section.

FIG. 2 shows the nozzle apparatus one according to FIG. 1A and FIG. 1B in an illustration in longitudinal section. The nozzle apparatus 1 is designed for operation with hydrogen as gaseous fuel and a kerosene-based and/or a kerosene-related fuel (for example, Jet A-1, diesel or synthetic substitute fuel (SAF—"sustainable aviation fuel")) as liquid fuel. The fuels can be used alternately with respect to one another and/or simultaneously.

The nozzle apparatus 1 has a nozzle main body 1b, via which gaseous and/or liquid fuel is injected into the combustion chamber during operation. Furthermore, the nozzle apparatus 1 has a nozzle holder 1a, oriented along the longitudinal axis L, with a line arrangement comprising a gas fuel line 2 and a liquid fuel line 4 for conducting liquid and/or gaseous fuel to the nozzle main body 1b.

FIGS. 3A, 3B, 3C to FIG. 6 each show the first connecting portion 100 of the connecting apparatus 10 with different illustrated components in a diagrammatic illustration in longitudinal section. The first connecting portion 100 is arranged, in particular, at the upstream end of the connecting apparatus 10, and serves to connect the gas and liquid fuel line 2, 4 to the connecting apparatus 10.

Figure 3A:
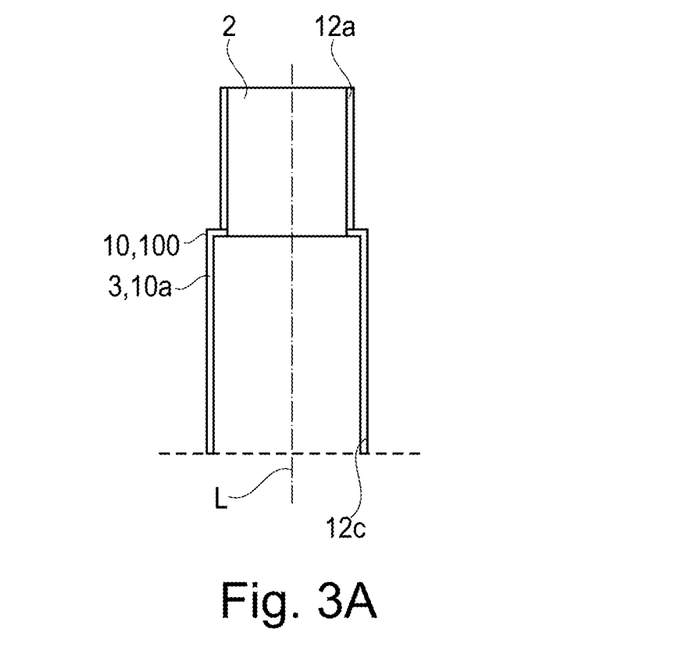
FIGS. 3A, 3B, 3C show a first connecting portion of the connecting apparatus according to FIGS. 1A, 1B with a hollow body as wall of the gas fuel line in a diagrammatic illustration in longitudinal section.
Figure 3B:
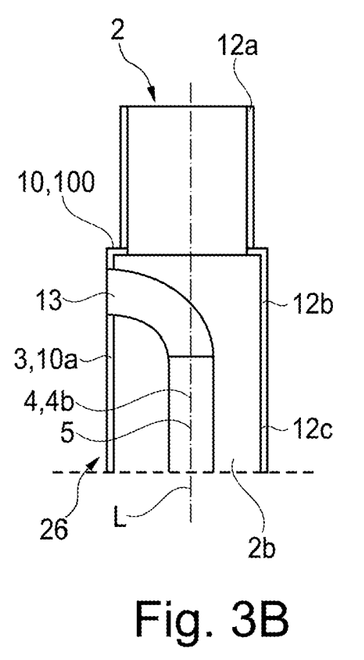
Figure 3C:
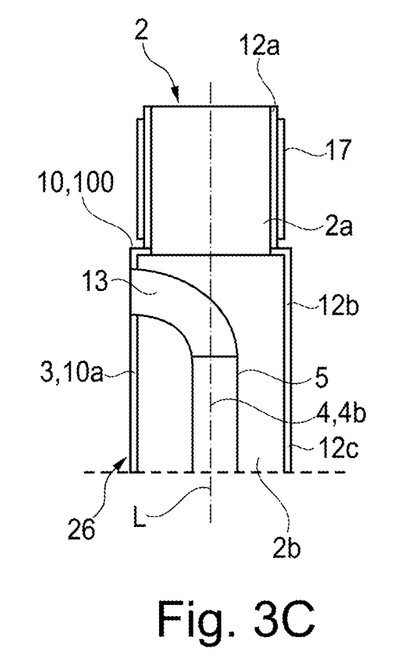

As FIG. 3A, FIG. 3B and FIG. 3C show, the connecting apparatus 10 has the gas fuel line 2 which is surrounded by a wall 3 for conducting the gaseous fuel. As FIG. 3A shows, in particular, the wall 3 is formed in the present case by a cylindrical hollow body 10a, in particular by a sleeve.

Furthermore, the connecting apparatus has the liquid fuel line 4 which is surrounded by a wall 5 for conducting the liquid fuel (cf. FIG. 3B and FIG. 3C).

At the upstream end of the wall 5 or the hollow body 10a, the gas fuel line 2 is formed by way of a separate gas line portion 12a which is, in particular, cylindrical and on or in which the liquid fuel line 4 is not arranged. Within the gas line portion 12a, the gas fuel line 2 has a circular flow cross section. There is preferably a fastening structure, in particular a thread 17, here on the radial outer side of the hollow body 10a, by means of which fastening structure the connecting apparatus 10 can be connected to the gas connector line 8 of the fuel feed line system.

By means of a transition portion 12b, the separate gas line portion 12a merges into a gas/liquid line portion 12c which is arranged downstream of the transition portion 12b and within which the gas fuel line 2 and the liquid fuel line 4 are arranged to form the line arrangement 26 for connection to the nozzle apparatus 1.

The portions of the gas fuel line 2, with the separate gas line portion 12a, the transition portion 12b and/or the gas/liquid portion 12c, are arranged coaxially with regard to the longitudinal axis L which runs in a straight line.

Within the gas/liquid line portion 12c, in the line arrangement 26, the liquid fuel line 4 is integrated into the gas fuel line 2, the liquid fuel line 4 being arranged so as to be surrounded by the gas fuel line 2. Here, the gas fuel line 2 and the liquid fuel line 4 are, in particular, of cylindrical configuration, with a circular circumference, and extend axially along and symmetrically with respect to the longitudinal axis L. The gas fuel line 2 extends cylindrically around the liquid fuel line 4, coaxially with regard to the longitudinal axis L, with the formation of a symmetrical angular gap with an annular flow cross section.

In order to advantageously keep the flow conditions, in particular the flow velocity, constant within the gas flow, the flow cross section of the gas fuel line 2 within the separate gas line portion 12a and of the gas/liquid line portion 12c, that is to say within the line arrangement 26, is configured to be of at least substantially identical size. For this purpose, the wall 3, in particular the hollow body 10a, has a widened cross-sectional portion at the transition from the separate gas line portion 12a to the transition portion 12b, which widened cross-sectional portion is configured in the present case as a cross-sectional step for a compact configuration. Here, the change within the flow cross section in the gas fuel line 2 is such that, downstream of the transition portion 12b, with a liquid fuel line 4 which is transferred into the line arrangement 26, the flow cross section of the gas fuel line 2 corresponds to the flow cross section within the separate gas line portion 12a.

Within the transition portion 12b, the liquid fuel line 4 is integrated into the gas fuel line 2 by a separate liquid line portion 4a outside the feel body 10a. Here, the liquid fuel line 4 is guided in a fluid-tight manner through the wall 3, and is brought into the arrangement, surrounded by the gas fuel line 2, within the line arrangement 26 in the gas/liquid line portion 12c.

Figure 5A:
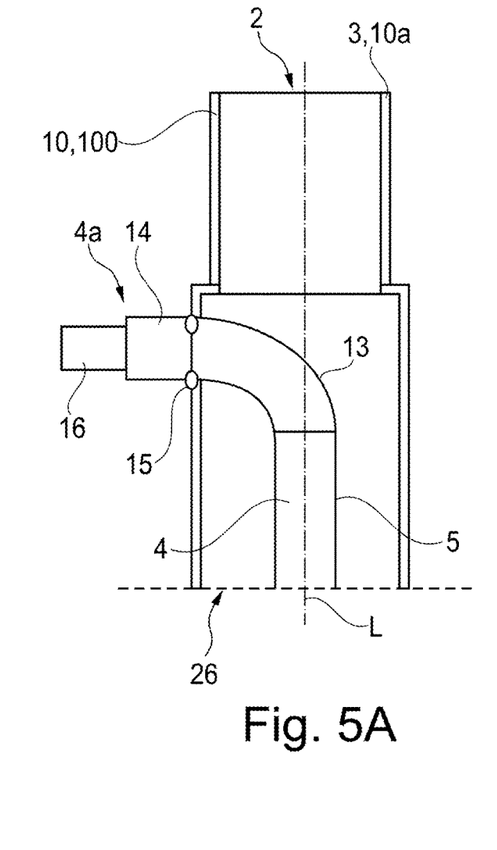
FIGS. 5A, 5B show the first connecting portion according to FIGS. 3A, 3B, 3C with an additionally shown, separate liquid line portion outside the wall, in a diagrammatic illustration in longitudinal section.
Figure 5B:
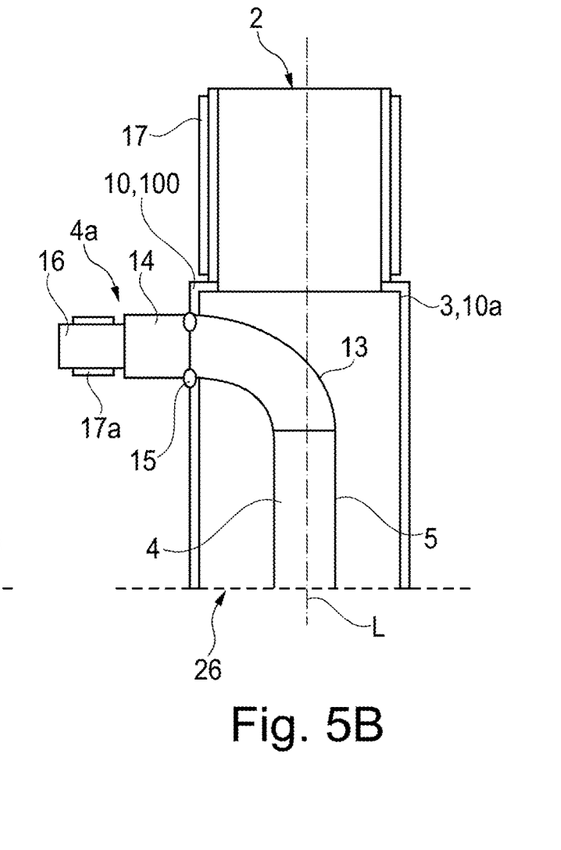

As shown in FIG. 5B and FIG. 5C, the liquid line portion 4a is arranged by way of example perpendicularly with respect to the wall 3 and/or the longitudinal axis L. Here, the transfer of the line course into the line arrangement 26 takes place by means of a deflection piece 13. The deflection piece 13 brings about a deflection in the course of the liquid fuel line 4 between the arrangement of the separate line portion 4a on the wall 5 and the longitudinal axis L, by way of example by 90° in FIGS. 3B, 3C.

According to the definition, the transition portion 12b extends from the cross-sectional step as far as the downstream end of the deflection piece 13.

Here, the defection piece 13 can be configured in one piece with the wall 3, or more precisely the hollow body 10a, as can be obtained, in particular, by means of an additive manufacturing method (3D printing). As an alternative, the transition piece 13 can be manufactured as a separate component, and can be joined to the wall 3 or the hollow body 10a in an integrally joined manner, for example by way of welding or soldering.

In the case of the exemplary embodiment shown in FIG. 3B and FIG. 3C, the deflection piece 13 is configured by way of example as a curve, with a continuous curvature course.

Figure 4A:
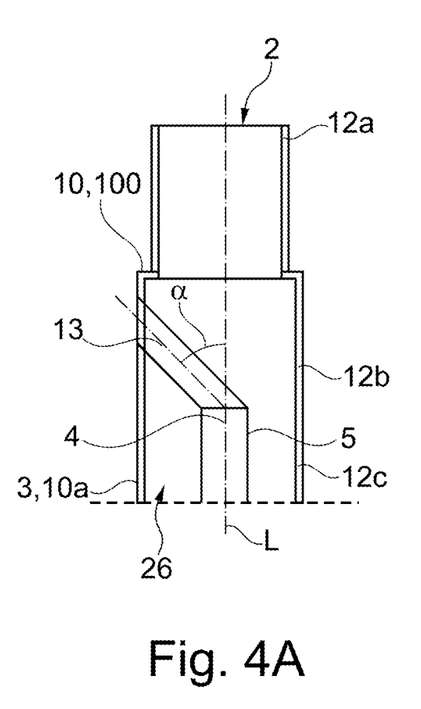
FIGS. 4A, 4B show the first connecting portion with deflection pieces within the liquid fuel line in different design variants in a diagrammatic illustration in longitudinal section.
Figure 4B:
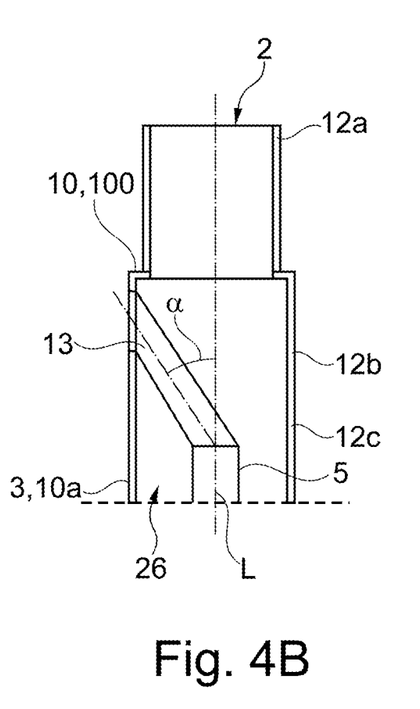

FIG. 4A and FIG. 4B each show a further design variant which is optimized for production by means of the additive manufacturing method. Here, the transition piece 13 is configured in such a way that the angle α with respect to the longitudinal axis L (included on that side of the longitudinal axis L which extends upstream of the vertex and a centre point of the deflection piece) is always equal to 45° (cf. FIG. 4A) or is smaller than 45° (cf. FIG. 4B). In this way, a high quality can be achieved during the production of the single-piece component by means of the additive manufacturing method. Here, the deflection piece 13 runs in a straight line by way of example, and has a kink in each case at the wall 3 and at the transition to the line arrangement 26.

FIG. 5A and FIG. 5B show the more precise configuration of the separate liquid line portion 4a. Here, the separate liquid line portion 4a has a cylindrical connecting piece 16 outside the wall 3, by means of which connecting piece 16 the liquid fuel line 2 is connected to the fuel feed line system, more precisely to the liquid connector line 9. For example, there can be a fastening structure, in particular a thread 17a, on the radial outer side of the connecting piece 16.

There is an intermediate piece 14 for simple assembly between the connecting piece 16 and the wall 3, which intermediate piece 14 is connected to the deflection piece 13 at a connection 15, for example in an integrally joined manner, by means of welding or soldering. There can be a cross-sectional step in the outer and/or inner cross section of the liquid fuel line 4 between the connecting piece 16 and the intermediate piece 14.

Figure 6A:
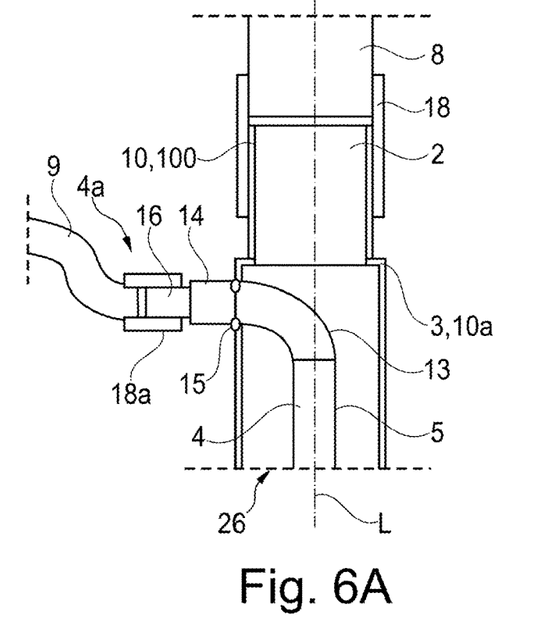
FIGS. 6A, 6B show the first connecting portion according to FIGS. 3A, 3B, 3C with fastening to the fuel feed line system by means of fastening elements, in a diagrammatic illustration in longitudinal section.
Figure 6B:
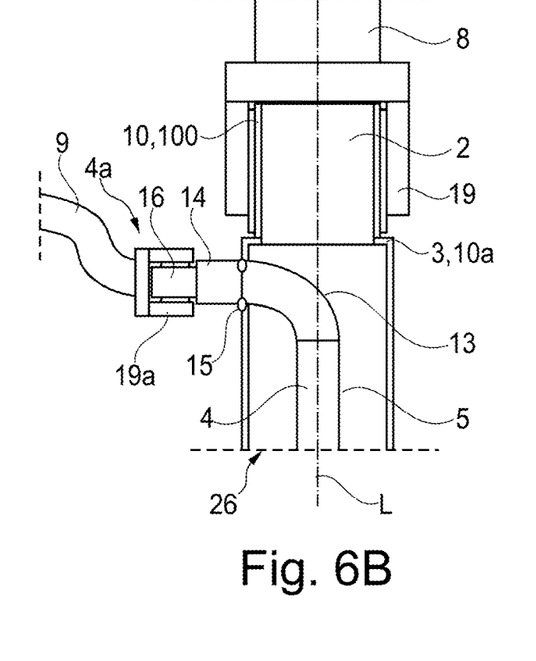

FIG. 6A and FIG. 6B show the connecting apparatus 10 connected to the fuel feed line system, parts of the gas connector line 8 and the liquid connector line 9 being shown in each case.

In the case of the design variant which is shown in FIG. 6A, the connection is configured by means of in each case one nut 18, 18a which is fastened to the corresponding connector line 8, 9 and engages in each case into the corresponding fastening structure, on the radial outer side of the separate gas line portion 12a and/or the connecting piece 16.

In the case of the design variant which is shown in FIG. 6B, the connection is configured by means of in each case one pressed sleeve 19, 19a which is arranged on the corresponding connector line 8, 9 and is pressed to the separate gas line portion 12a and/or the connecting piece 16.

Figure 7:
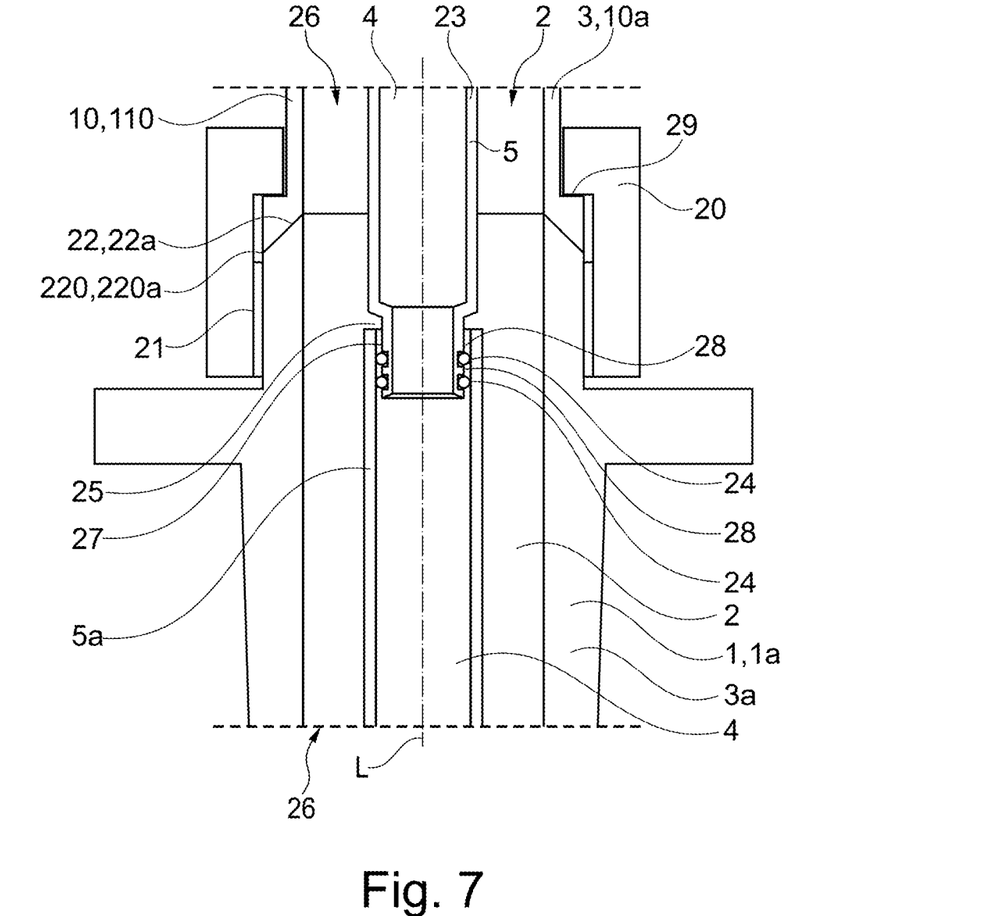
FIG. 7 shows a second connecting portion of the connecting apparatus according to FIGS. 1A, 1B, by means of which the connecting apparatus is connected to the nozzle apparatus, and a part of the nozzle apparatus in a diagrammatic illustration in longitudinal section.
Figure 8:
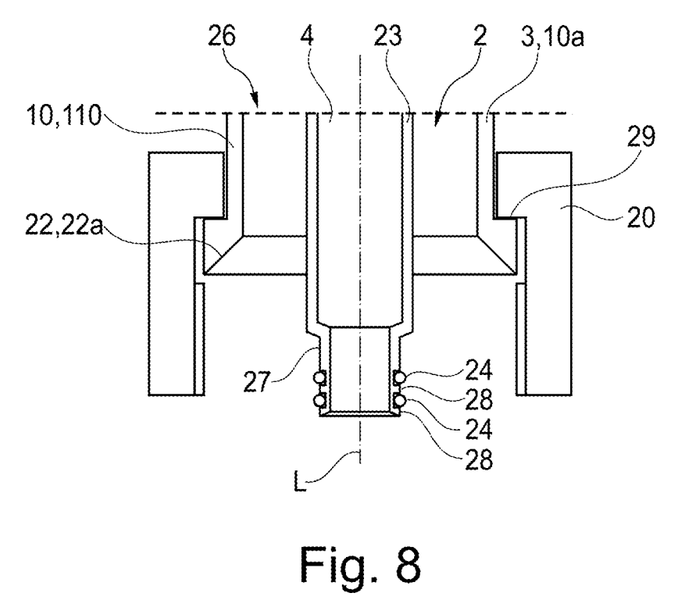
FIG. 8 shows the second connecting portion according to FIG. 7 in a diagrammatic illustration in longitudinal section.

FIG. 7 and FIG. 8 each show that second connecting portion 110 of the connecting apparatus 10 which is arranged at the downstream end of the connecting apparatus 10. The second connecting portion 110 serves to connect the gas and liquid fuel line 2, 4 of the connecting apparatus 10 with a fluid-tight connection to the nozzle apparatus 1.

For this purpose, the second connecting portion 110 has a connecting arrangement, and the upstream end of the nozzle apparatus 1 has a complementary connecting arrangement, by means of which connecting arrangements the connecting apparatus 10 and the nozzle apparatus 1 are connected in a fluid-tight manner.

Figure 9:
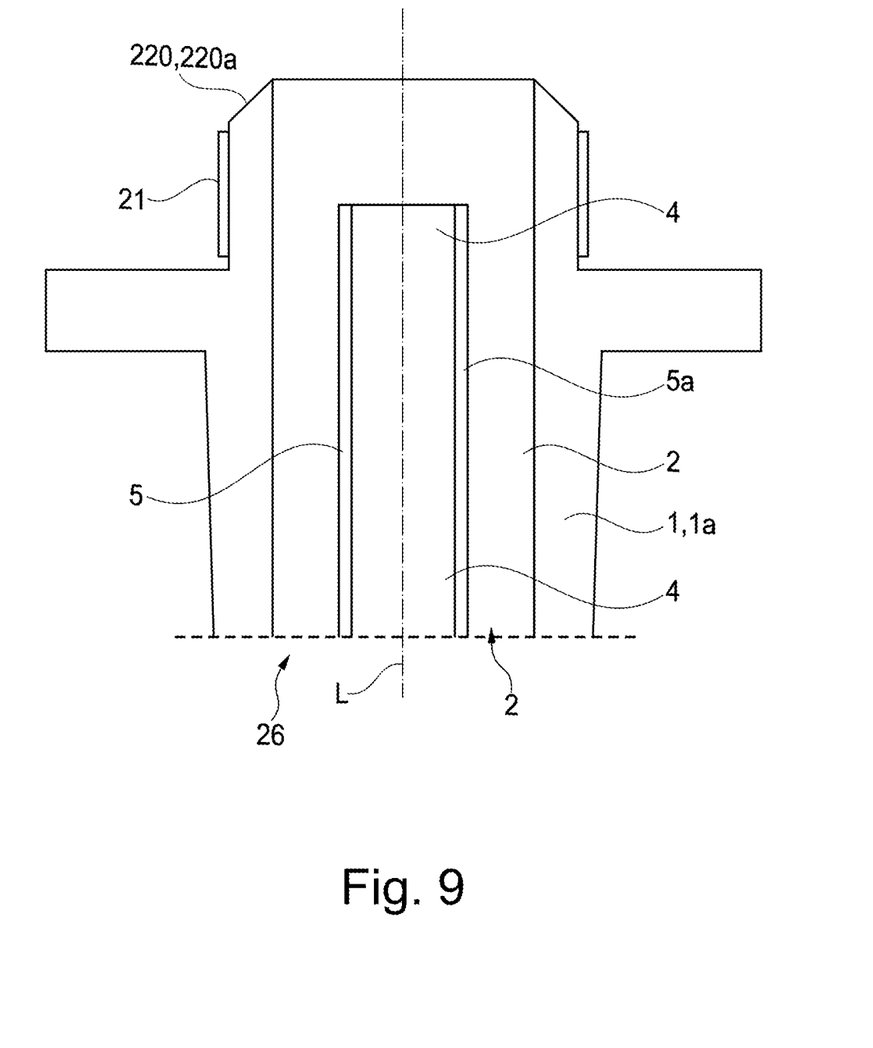
FIG. 9 shows a part of the nozzle apparatus according to FIG. 7 in a diagrammatic illustration in longitudinal section.

At least at the upstream end of the nozzle apparatus 1, in particular within the nozzle holder 1a, the gas fuel line 2 and the liquid fuel line 4 are arranged with respect to one another in the line arrangement 26. Here, in particular, a complementary wall 3a of the gas fuel line 2 and a complementary wall 5a of the liquid fuel line 4 have the same wall thicknesses at the upstream end of the nozzle apparatus 1 as the walls 3, 5, and/or the flow cross sections are configured so as to be equally large and homogeneous. During operation, this brings about an at least largely homogeneous flow of the gaseous fuel and/or the liquid fuel at the transition between the connecting apparatus 10 and the nozzle apparatus 1.

FIG. 7 shows the second connecting portion 110 connected to the upstream end of the nozzle apparatus 1, FIG. 8 shows the second connecting portion 110 separately, and FIG. 9 shows the upstream end of the nozzle apparatus 1 separately.

The connecting arrangement comprises a sealing cone 22 which is arranged at the downstream end of the wall 3 or the hollow body 10a. The sealing cone 22 forms a radially inwardly directed sealing surface 22a on the wall 3. The complementary connecting arrangement of the nozzle apparatus 1 comprises a complementary sealing cone 220a which is arranged at the upstream end of the complementary wall 3a. The complementary sealing cone 220 forms a radially outwardly directed (in the flow direction) sealing surface 220a on the complementary wall 3a. In a mounted state, the sealing surfaces 22a and 220a are pressed onto one another by means of the fastening element 20, and bring about a fluid-tight sealing action of the gas fuel channel 2 with respect to the surroundings of the nozzle apparatus 1.

The connecting arrangement has a notch 29 which is configured in a radially outwardly circumferential manner at the downstream end of the wall 3 and forms a cross-sectional step with regard to the external dimensions of the wall 3 or the hollow body 10*a*. The notch 29 forms a stop for a fastening element 20, in particular a nut. A fastening structure, in particular a thread 21, is arranged on the radial outer side of the complementary wall 3*a*, into which thread 21 the fastening element 20 engages for connection of the connecting apparatus 10 and the nozzle apparatus 1. In a connected state, the fastening element 20 extends axially over the position of the sealing surfaces 22*a* and 220*a*.

Furthermore, the connecting arrangement has a tapered portion 27 of the outer diameter of the liquid fuel line 4 at the downstream end of the wall 5 of the liquid fuel line 4. The liquid fuel line 4 is configured as a sleeve 23 at least in this region. The tapered portion 27 is configured in such a way that the wall 5 can be pushed or is pushed into the complementary wall 5*a*, in particular in a positively locking manner. Here, the inner diameter of the complementary wall 5*a* preferably corresponds to the inner diameter of the wall 5 upstream of the tapered portion 27. In the axial region of the tapered portion 27, there are preferably a plurality of (in the present case, two by way of example) annularly circumferential cut-outs 28 in the wall 5 in each case for receiving a sealing means 24, in particular in the form of a sealing ring (cf. FIG. 8). In a connected state (cf. FIG. 7), the installed sealing means 24 serve to seal the liquid fuel line 4 with respect to the surrounding gas fuel line 2.

The connection between the walls 5, 5*a* of the liquid fuel line 4 is, in particular, of axially sliding configuration, with the result that an axial displacement is possible. In particular, the connection is such that there is always a circumferential gap 25 between the cross-sectional step to the tapered portion 27 of the wall 5 and the upstream end of the complementary wall 5*a*. It is ensured in this way that the axial force which is applied by means of the fastening element 20 for connecting the connecting apparatus 10 and the nozzle apparatus 1 acts solely as a pressing force on the sealing surfaces 22*a*, 220*a*, and a sufficient sealing action for sealing the gas fuel line 2 is achieved.

The tapered portion 27 is arranged further downstream than the sealing surface 22*a* of the surrounding wall 3. In this way, the transition between the connecting apparatus 10 and the nozzle apparatus 1 is arranged offset within the liquid fuel line 2, in particular downstream, with respect to the transition within the gas fuel line 2.

By means of the connecting apparatus according to the invention, a connection which is reliable and simple to assemble can be provided between the nozzle apparatus 1 and the fuel feed line system, which connection is optimized with regard to the flow guidance of the fuels, in particular of the gaseous fuel, during operation.

LIST OF REFERENCE SIGNS

1 Nozzle apparatus
1*a* Nozzle holder
1*b* Nozzle main body
2 Gas fuel line
3 Wall
3*a* Complementary wall
4 Liquid fuel line
4*a* Separate liquid line portion
5 Wall
5*a* Complementary wall
6 Gas ring line
7 Liquid ring line
8 Gas connector line
9 Liquid connector line
10 Connecting apparatus
100 First connecting portion
10*a* Hollow body
110 Second connecting portion
12*a* Separate gas line portion
12*b* Transition portion
12*c* Gas/liquid line portion
13 Deflection portion
14 Intermediate piece
15 Connection
16 Connecting piece
17 Thread
17*a* Thread
18 Nut
18*a* Nut
19 Pressed sleeve
19*a* Pressed sleeve
20 Fastening element
21 Thread
22 Sealing cone
220 Complementary sealing cone
22*a* Sealing surface
220*a* Complementary sealing surface
23 Sleeve
24 Sealing means
25 Gap
26 Line arrangement
27 Tapered portion
28 Cut-out
29 Notch
L Longitudinal axis

The invention claimed is:

1. A connecting apparatus for a fluid connection between a fuel feed line system and a nozzle apparatus of a gas turbine arrangement with a gas fuel line which is surrounded by a first wall for conducting a gaseous fuel, and a liquid fuel line which is surrounded by a second wall for conducting a liquid fuel,
   wherein the connecting apparatus includes at least one separate gas line portion arranged on an inlet side of the gas fuel line and a gas/liquid line portion which is arranged downstream of the at least one separate gas line portion and within which the gas fuel line and the liquid fuel line are arranged to form a line arrangement for connection to the nozzle apparatus, and
   wherein a flow cross section of the gas fuel line is of at least substantially identically large configuration within the at least one separate gas line portion and the gas/liquid line portion.

2. The connecting apparatus according to claim 1, wherein, the gas fuel line is arranged around the liquid fuel line in the gas/liquid line portion, in a cylindrical and/or coaxial manner.

3. The connecting apparatus according to claim 1, wherein a transition portion is arranged between the at least one separate gas line portion and the gas/liquid line portion, and within the transition portion, the liquid fuel line is guided through the first wall in a fluid-tight manner and is surrounded by the gas fuel line, within the line arrangement.

4. The connecting apparatus according to claim 3, wherein the liquid fuel line is brought within the transition portion by a deflection piece, configured as a pipe, from the first wall to within the line arrangement, the deflection piece forming a deflection in a course of the liquid fuel line from a first course which adjoins the first wall on an exterior of the connecting apparatus to a second course within the line arrangement, the deflection being within a range of from 70° to 100°.

5. The connecting apparatus according to claim 4, wherein the deflection piece is connected to the first wall in a single-piece or integrally joined manner.

6. The connecting apparatus according to claim 4, wherein the deflection piece is of arcuate configuration.

7. The connecting apparatus according to claim 4, wherein the deflection piece has a straight configuration and/or is positioned at an angle of 45° or less with regard to a longitudinal axis of the second wall.

8. The connecting apparatus according to claim 4, wherein the liquid fuel line has, in a separate liquid line portion outside the first wall, a connecting piece for connection to a liquid connector line of the fuel feed line system, the liquid connector line being joined to the deflection piece, with an intermediate piece arranged in between.

9. The connecting apparatus according to claim 3, wherein the gas fuel line is oriented along a longitudinal axis of the connecting apparatus, with portions of the gas fuel line, the at least one separate gas line portion and/or the transition portion and/or the gas/liquid line portion, being arranged coaxially with regard to the longitudinal axis.

10. The connecting apparatus according to claim 1, wherein the first wall of the gas fuel line is configured as a circumferential hollow body.

11. The connecting apparatus according to claim 1, wherein the first wall has a radially outer side and on the radially outer side, a thread for connection to a gas connector line of the fuel feed line system.

12. The connecting apparatus according to claim 3, wherein the first wall includes a widened cross-sectional portion at a transition from the at least one separate gas line portion to the transition portion.

13. The connecting apparatus according to claim 1, wherein, from a downstream end of the first wall and/or the second wall, the connecting apparatus includes a connecting arrangement configured for connection to the nozzle apparatus in a fluid-tight manner.

14. The connecting apparatus according to claim 13, wherein, at the downstream end of the first wall, the connecting arrangement includes a sealing cone with the formation of a radially inwardly directed sealing surface, for sealing the gas fuel line in operative connection to a complementary sealing surface on the nozzle apparatus.

15. The connecting apparatus according to claim 14, wherein, at the downstream end of the second wall, the connecting arrangement has a tapered portion of an outer diameter such that the second wall is insertable in a positively locking manner, into the liquid fuel line, surrounded by a complementary wall of the nozzle apparatus, and within the nozzle apparatus, an inner diameter of the complementary wall corresponds to an inner diameter of the second wall upstream of the tapered portion.

16. The connecting apparatus according to claim 15, and further comprising at least one annular cut-out for receiving a seal in an axial region of the tapered portion.

17. The connecting apparatus according to claim 15, wherein the tapered portion is configured such that an axially sliding connection is formed in a mounted state, with a circumferential gap being formed between an upstream end of the complementary wall and a cross-sectional step to the tapered portion.

18. The connecting apparatus according to claim 13, wherein the connecting arrangement includes a cross-sectional step that is configured radially on an exterior at the downstream end of the first wall and is circumferential, and includes a notch.

19. The connecting apparatus according to claim 15, wherein the sealing surface is arranged offset axially with respect to the tapered portion, upstream of the tapered portion.

20. The connecting apparatus according to claim 13, and further comprising a first connecting portion comprising at least the transition portion and a second connecting portion comprising at least one part of the line arrangement and the connecting arrangement, the first connecting portion and the second connecting portion being configured in one piece or being connected to one another in a positively locking, non-positive and/or integrally joined manner.

21. A nozzle apparatus with a complementary connecting arrangement, by which the nozzle apparatus is connected in a fluid-tight manner to the connecting apparatus according to claim 1.

22. A gas turbine arrangement with at least one of the connecting apparatus according to claim 1.

* * * * *